May 23, 1972 H. R. NILSSON 3,664,778
ROTARY INTERNAL COMBUSTION ENGINE AND SEALING MEANS THEREFOR
Original Filed June 5, 1968
8 Sheets-Sheet 1

May 23, 1972   H. R. NILSSON   3,664,778
ROTARY INTERNAL COMBUSTION ENGINE AND SEALING MEANS THEREFOR
Original Filed June 5, 1968   8 Sheets-Sheet 4

United States Patent Office 3,664,778
Patented May 23, 1972

3,664,778
ROTARY INTERNAL COMBUSTION ENGINE AND SEALING MEANS THEREFOR
Hans Robert Nilsson, Ektorp, Sweden, assignor to Svenska Rotor Maskiner Aktiebolag, Nacka, Sweden
Original application June 5, 1968, Ser. No. 734,587, now Patent No. 3,491,730, dated Jan. 27, 1970. Divided and this application Nov. 12, 1969, Ser. No. 875,863
Claims priority, application Great Britain, June 7, 1967, 26,302/67
The portion of the term of the patent subsequent to Jan. 27, 1987, has been disclaimed
Int. Cl. F01c *19/00, 1/08;* F04c *27/00*
U.S. Cl. 418—117                     5 Claims

ABSTRACT OF THE DISCLOSURE

Rotary internal combustion engine comprising two intermeshing grooved rotors mounted in a stationary housing, providing continuously sealed inlet sluice chambers, operation chambers, for compression, combustion and expansion, and outlet sluice chambers, having a set of sealing elements for positive sealing of each chamber.

---

This application is a divisional of my copending application Ser. No. 734,587, now U.S. Pat. 3,491,730 issued Jan. 27, 1970.

This invention generally relates to rotary internal combustion engines of the positive displacement type comprising three main members. One member is a support member on housing and the other two are movable members provided with intermeshing grooves and lands. Upon movement, the members provide in sequence two separate inlet sluice chambers, each constituted by a groove; a sealed operation chamber formed by merging of the inlet sluice chambers, which operation chamber first diminishes in volume to a minimum value at maximum intermesh resulting in compression of the working fluid, and thereafter increases in volume resulting in expansion of the working fluid; and, by subsequent division of the operation chamber, two outlet sluice chambers, each constituted by a groove. The internal combustion of the engine takes place within the operation chamber during a period when the volume of the working chamber is close to the minimum volume thereof.

An engine of this type is shown in my U.S. Pat. No. 3,468,294, granted Sept. 23, 1969.

The present invention refers particularly to a set of sealing elements for an engine of the type described above. Those sealing elements are of essential importance as it has been found that the internal leakage within such a machine has to be brought down to a minimum. A clearance between the cooperating members amounting to only 0.01 mm. is too much if the engines are to operate with acceptable efficiency.

Even though in the embodiment of the invention shown in this application as well as in my U.S. Pat. No. 3,468,294 mentioned above the two grooved members are rotors rotatably mounted in a supporting housing structure it is also possible especially by using internal and external gearing to form one of the grooved members as the housing structure.

The present invention more specifically relates to an engine of the type referred to above which is provided with a set of sealing elements for positive sealing of the clearances along the lines of cooperation between the different members thereof. By using the sealing elements according to the invention the leakage within the engine can be brought down to such a small value that it is acceptable from efficiency point of view. The details of the invention will be apparent as this specification proceeds.

The invention will now be described more in detail in connection with an embodiment thereof shown in the accompanying drawings in which.

Figure 1:
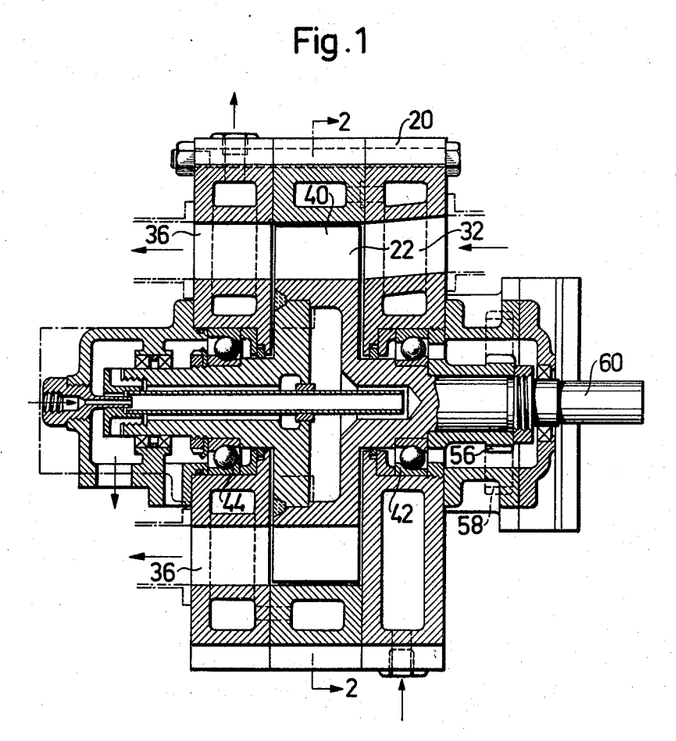
FIG. 1 is a longitudinal section taken along line 1—1 in FIG. 2.
Figure 2:
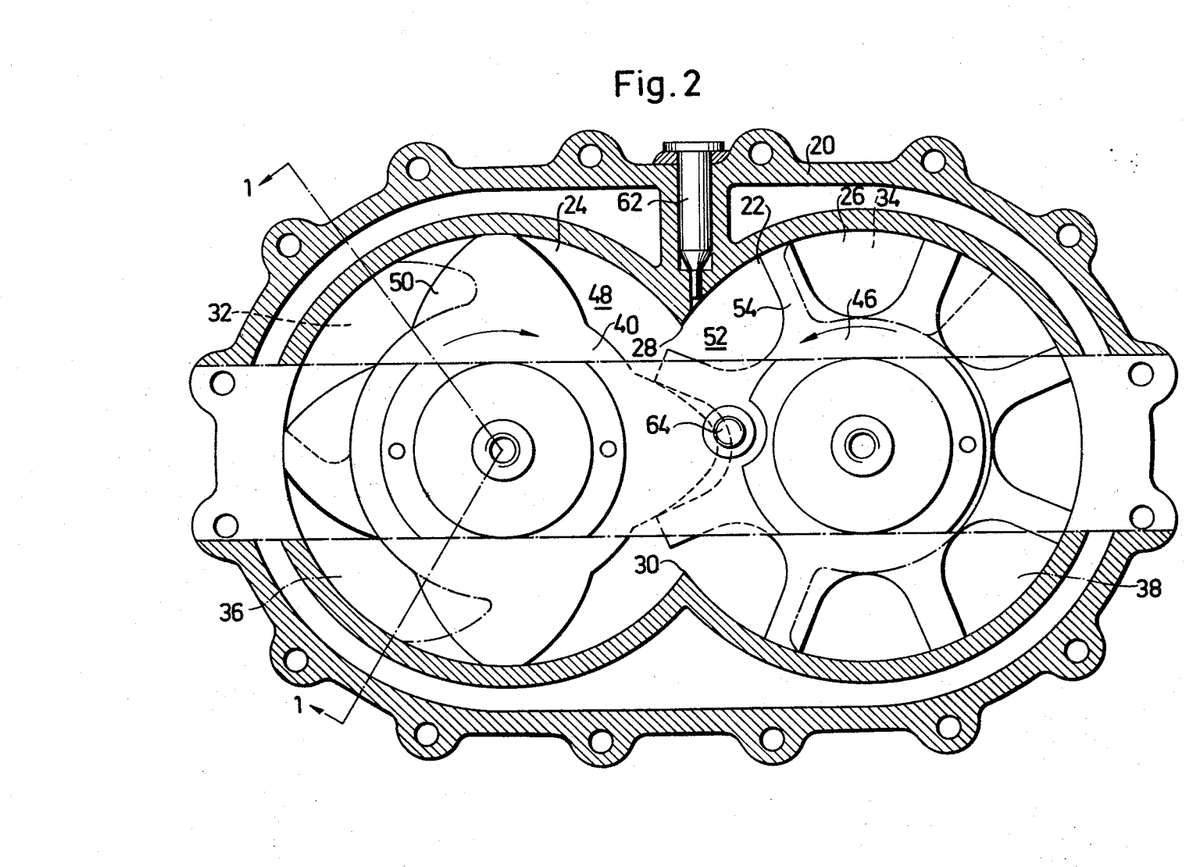
FIG. 2 is a section taken along line 2—2 in FIG. 1.

The engine shown comprises a housing 20, forming a first, support member of the engine, enclosing a working space 22 consisting of two cylindrical bores 24, 26 having parallel axes and intersecting along two straight axially extending lines 28, 30. The housing 20 has two separate axial inlet channels 32, 34, one communicating with each bore 24, 26. Fresh air for scavenging and charging the engine is supplied through the inlet channels 32, 34 and exhaust gas is removed from the engine through the outlet channels 36, 38. A primary rotor 40, forming a second member of the engine, is carried in bearings 42, 44 so as to be coaxially mounted in the bore 24 which communicates with the channels 32 and 36. A secondary rotor 46, forming a third member of the engine, is, in the same way, coaxially mounted in the bore 26 which communicates with the channels 34 and 38.

The primary rotor 40 is generally cylindrical around its axis and is provided with four straight, axially extending grooves 48 in its cylindrical surface with intervening lands 50. The secondary rotor 46 is generally cylindrical around its axis and provided with eight straight, axially extending grooves 52 in its cylindrical surface with intervening lands 54. The two rotors 40, 46 are fitted with a synchronizing gearing located outside the working space 22 and comprising one gear 56, 58 non-rotatably connected with each of the rotors 40, 46. The primary rotor 40 is further provided with an external stub shaft 60 for transmission of power from the engine.

An injection nozzle 62 (see FIG. 2) for supplying fuel in the form of combustible liquid obtained from a pressure liquid source, not shown, into the working space 22 is located in the housing 20 in such a place that the liquid is injected into a groove 52 of the secondary rotor 46 after that said groove 52 has been moved out of communication with the corresponding inlet channel 34 and before the mating land 50 of the primary rotor 40 enters said groove 52.

Means, in the forms of a spark plug 64, for igniting the combustible fuel mixture is provided in at least one end wall of the housing 20 and located within an area thereof facing the working space in an angular position of the rotors 40, 46 in which the free space of a secondary rotor groove 52 in a plane transverse to the axes of the rotors is limited only by the flanks of the groove 52 and of the mating primary rotor land 50. Preferably the spark plug 64 is located in an area of the end wall limited by the flanks of the groove 52 and of the land 50 when said groove and said land are in or close to their maximum intermesh position.

Figure 3:
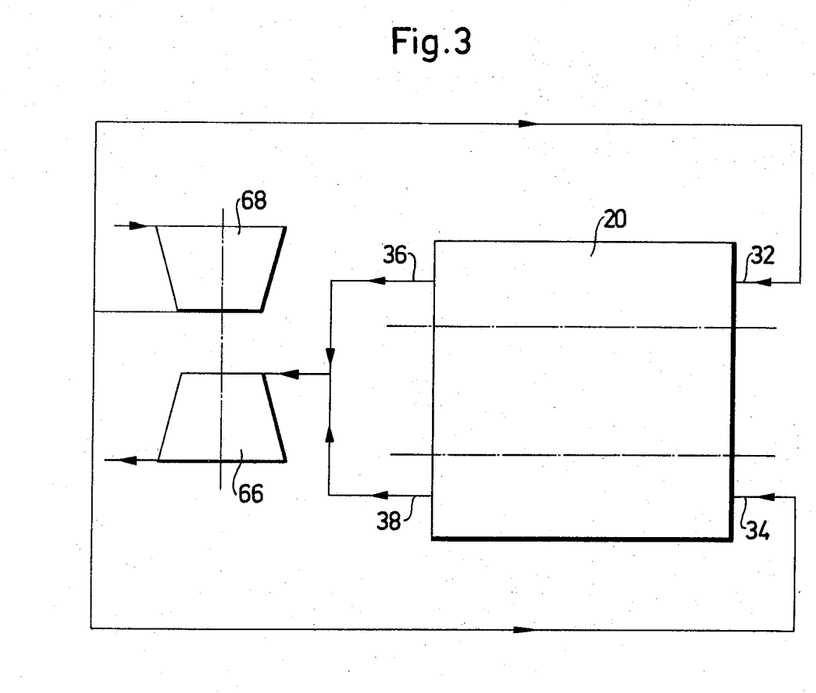
FIG. 3 is a diagram showing the flow of the working fluid outside the working space of the engine.
Figure 4:
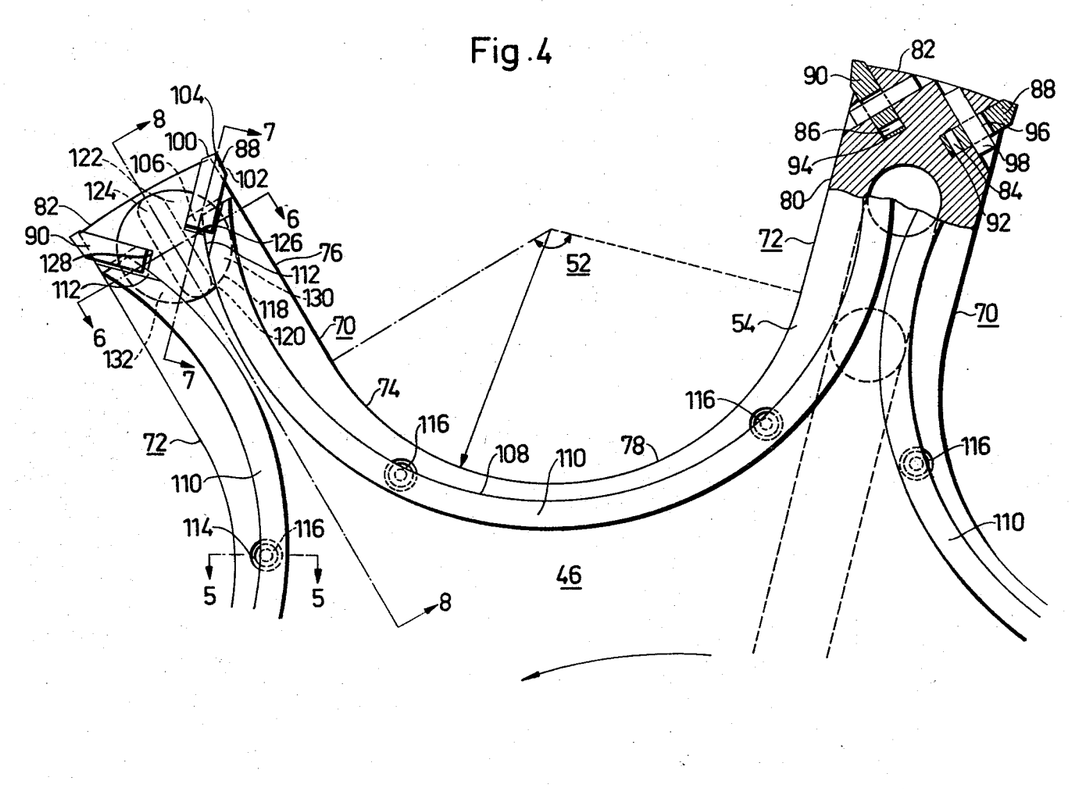
FIG. 4 is a fragmentary end view of the secondary rotor.
Figure 5:
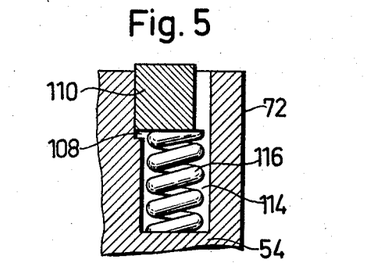
FIG. 5 is a section taken along line 5—5 in FIG. 4.
Figure 6:
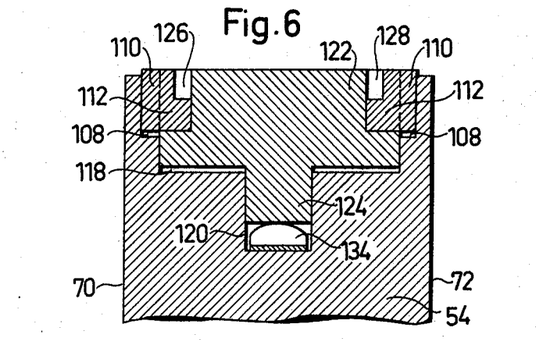
FIG. 6 is a section taken along line 6—6 in FIG. 4.
Figure 7:
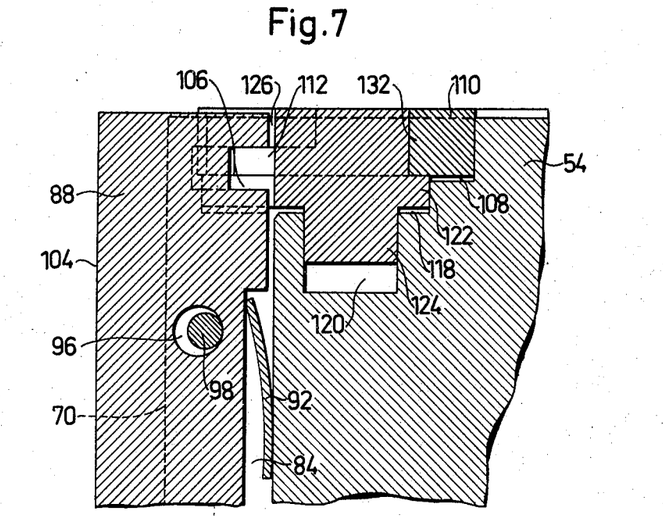
FIG. 7 is a section taken along line 7—7 in FIG. 4.

The outlet channels 36, 38 from the working space 22 communicate with a turbine 66 driven by the exhaust gases. The turbine 66 is connected with a blower 68 acting as scavenging pump communicating with the inlet channels 32, 34 to the working space 22 (FIG. 3).

The details of the primary and secondary rotors 40, 46 will now be discussed more in detail in conjunction with FIGS. 4 to 15.

A groove 52 of the secondary rotor 46 (see FIG. 4) is provided with a leading flank 70 and a trailing flank 72 merging into each other to form a bottom portion of the groove. The leading flank 70 comprises an inner portion 74 following a circular arc having its centre on the line of symmetry of the groove and an outer portion 76 forming a tangent to the inner portion and being parallel with a radius of the rotor drawn centrally through the adjacent land 54. The trailing flank 72 comprises correspondingly shaped inner and outer portions 78 and 80, respectively. A land 54 of the secondary rotor 46 is further provided with a crest portion 82 cylindrical around the axis of the rotor.

An axially extending smoothly machined slot 84, 86 (FIGS. 4 and 7) is formed in the axially extending edge portion of each flank 70, 72 of the secondary rotor 46 in which slot a closely fitting sealing strip 88, 90 is located. In each slot 84, 86 there is a bowed leaf spring 92, 94 acting upon the sealing strip 88, 90 and biasing the strip to project from the slot. A number of axially distributed openings 96 in the sealing strip 88 cooperates with pins 98 of smaller radial extent and fixed in the rotor 46 to restrict the amount of projection of the strip 88, 90. The projecting portion of the sealing strip 88, 90 is provided with a profile comprising one surface 100 parallel with the adjacent crest portion 82 and one surface 102 undercut with regard to a radial line from the axis of the rotor 46, thus providing an edge 104 at the outermost end of the sealing strip. Each sealing strip 88, 90 is further close to each end thereof provided with a notch 106 therein the function of which will be evident as this specification proceeds.

In each axial end surface of the secondary rotor 46 a number of smoothly machined slots 108 (FIG. 6) are formed, each extending around a groove 52 and located adjacent to the flanks 70, 72 thereof. A sealing element 110 in the form of a continuous strip is located in each of said slots 108 and closely fitting therein. The ends of the strip 110 are partly cut away leaving a tongue 112 extending into the notch 106 of the axially extending sealing strip 88, 90. A number of holes 114 are provided in the bottom of the slot 108, each hole 114 enclosing a helical spring 116 biasing the strip 110 to project from the slot 108. A cylindrical, smoothly machined recess 118 is formed in each end surface of each land 54 on the line of symmetry and close to the crest portion 82 thereof. The recess 118 has a diameter which is small relative to the radial extent of the adjacent groove 52 and so great that the recess 118 extends out and opens into the two slots 108.

Figure 8:
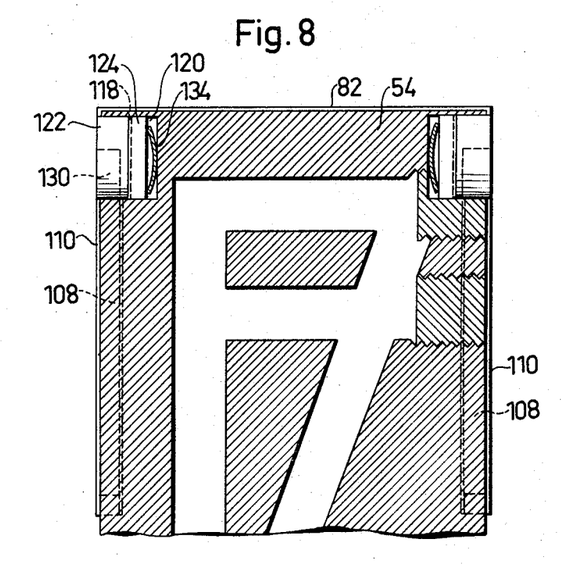
FIG. 8 is a section taken along line 8—8 in FIG. 4.
Figure 9:
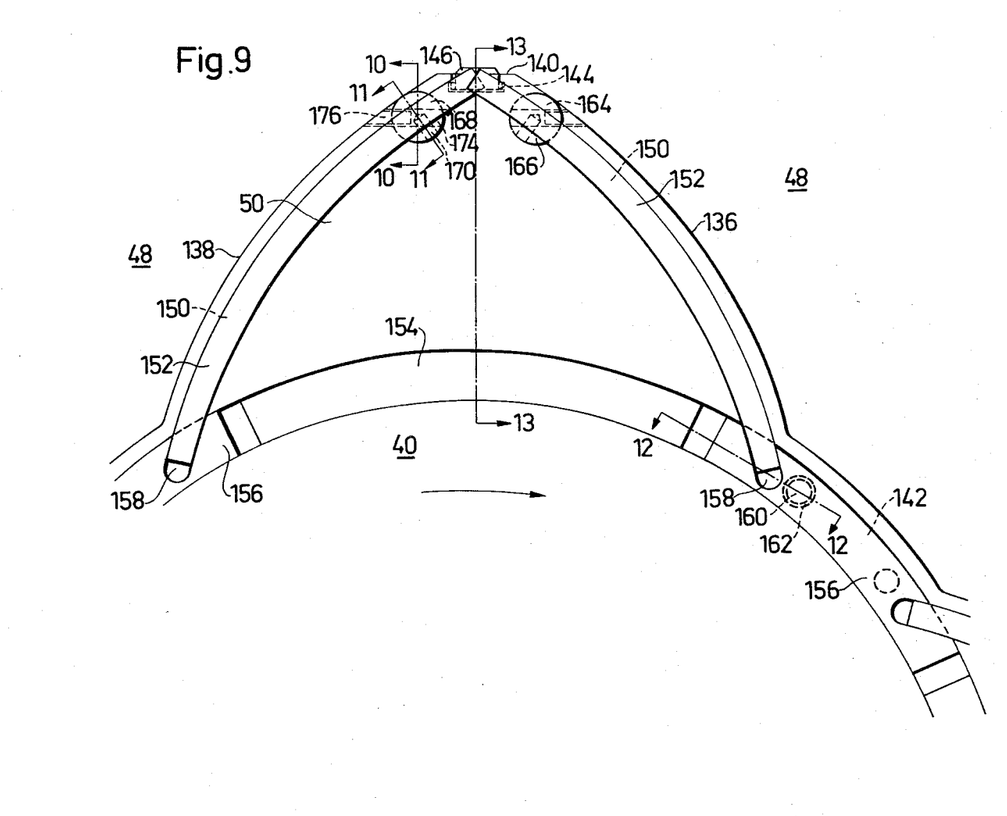
FIG. 9 is a fragmentary end view of the primary rotor.
Figure 10:
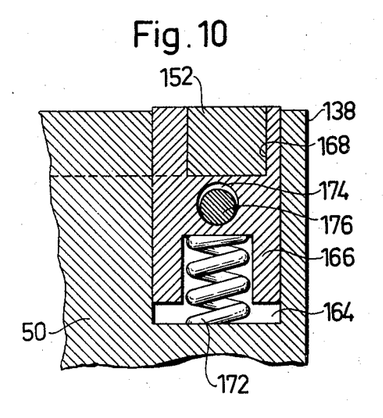
FIG. 10 is a section taken along line 10—10 in FIG. 9.
Figure 11:
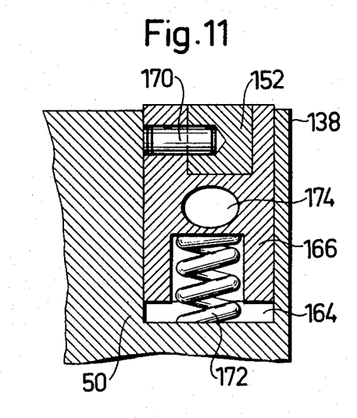
FIG. 11 is a section taken along line 11—11 in FIG. 9.
Figure 12:
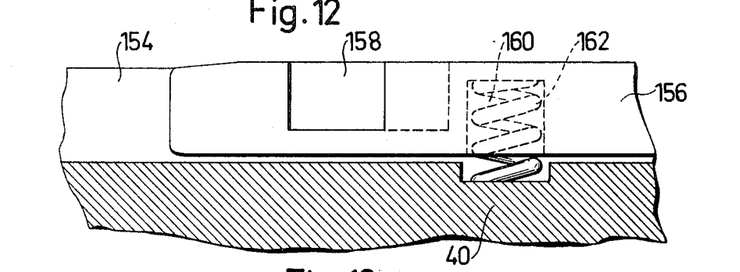
FIG. 12 is a section taken along line 12—12 in FIG. 9.
Figure 13:
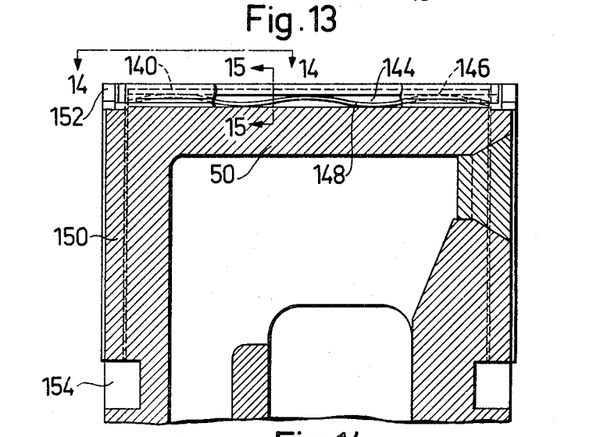
FIG. 13 is a section taken along line 13—13 in FIG. 9.
Figure 14:
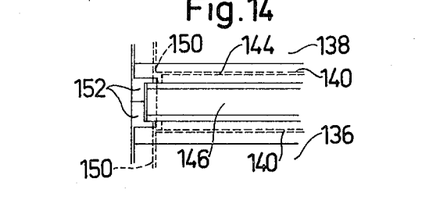
FIG. 14 is a fragmentary view taken along line 14—14 in FIG. 13
Figure 15:
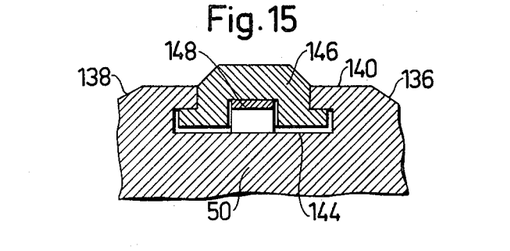
FIG. 15 is a section taken along line 15—15 in FIG. 13.

The axial extent of the recess 118 is greater than that of the slots 108. The recess 118 in the bottom thereof is provided with a smoothly machined extension 120 thereof having a generally rectangular profile provided with rounded ends disposed generally along the diameter of the recess 118 following a radial line from the axis of the rotor 46. A sealing body 122 of generally cylindrical form having a greater axial extent than that of the slots 108 is located and sealingly fitting in the recess 118 and provided with a projection 124 located and closely fitting in the extension 120 of the recess 118 (FIG. 8). The sealing body 122 is further provided with notches 126, 128 in the barrel surface thereof for the axially extending sealing strips 88, 90 and with notches 130, 132 in the projecting end surface thereof, each end surface notch 130, 132 having a form corresponding to that of the slots 108 and an axial extent coinciding with that of the sealing strip 110. A spring 134 is located within the extension 120 of the recess 118 acting on the sealing body 122 and biasing the sealing body 122 and the sealing strips 110 to project from the recess 118 and the slots 108, respectively. The amount of projection is restricted by the tongues 112 located in the notches 106 of the axially extending sealing strips 88, 90.

A land 50 of the primary rotor 40 (see FIG. 9) is provided with a leading flank 136 and a trailing flank 138 separated by a crest portion 140 cylindrical around the axis of the rotor 40. A groove 48 of the primary rotor 40 is further provided with a bottom portion 142 separating the flanks 138, 140 of the adjacent lands which bottom portion 142 is cylindrical around the axis of the rotor 40. The leading flank 136 follows an epicycloidal curve generated by the edge 104 of the sealing strip 88 located in the axially extending edge portion of the leading flank 70 of the cooperating groove 52 of the secondary rotor 46, whereas the trailing flank 138 follows a corresponding epicycloidal curve generated by the edge of the sealing strip 90 in the axially extending edge portion of the trailing flank 72 of the groove 52.

In the crest portion 140 (FIG. 15) of each land 50 of the primary rotor 40 there is an axially extending smoothly machined slot 144 in which a closely fitting sealing strip 146 is located. In each slot 144 there is a bowed leaf spring 148 acting upon the sealing strip 146 and biasing the strip out of the furrow. The strip 146 as well as the slot 144 has a T-shaped profile thus restricting the amount of projection of the strip.

In each axial end surface of the primary rotor 40 a number of smoothly machined grooves 150 are formed (FIGS. 9, 13), each extending out to the crest portion 140 thereof, curved correspondingly to the profile of the adjacent flank 136, 138 of a land 50 and disposed in close proximity thereto. The grooves 150 following the different flanks 136, 138 of a land 50 intersect close to the crest portion 140 of the land. A sealing element in the form of a continuous strip 152 is located in each of said grooves 150 and closely fitting therein. The ends of the strips 152 extending out into the intersection area of the grooves 150 are partly cut away leaving a tongue on each strip which tongues cooperate to form a continuous sealing line around the crest portion of the land 50. A continuous annular, smoothly machined recess 154 having a small radial extent relative to that of the rotor grooves 48 is formed in each end surface of the primary rotor 50 which recess 154 is located radially adjacent to the bottom portions 142 of the grooves 48, opens into the grooves 150 and has a larger axial extent than that of the slots 150 in the lands 50. Peripherally adjacent to each bottom portion 142 a sealing body 156 is located closely fitting in the recess 154. In each sealing body 156 notches 158 are provided, each forming an extension of a slot 150 in the lands 50 and having an axial extent coinciding with that of the strip 152, each notch 158 enclosing an end of the corresponding sealing strip 152. In the surface of sealing body 156 facing the bottom of the recess 154 there are two holes 160, each enclosing a helical spring 162 biasing the sealing body 156 and the sealing strips 152 to project from the recess 154 and the slots 150, respectively. Two cylindrical, smoothly machined recesses 164, each having a small radial extent relative to that of the adjacent rotor groove 48, are further formed in each end surface of each land, each recess 164 extending over the complete peripheral extent of one of the recesses 154, opening into the recess 154 and having a larger axial extent than that of the recess 154. In each of the cylindrical recesses 164 a cylindrical sealing body 166 is located, having a greater axial extent than that of the recess and closely fitting in the recess 164. A notch 168 is provided in the projecting end surface of the sealing body 166 which notch 168 has a form corresponding to that of the recess 154 and an axial extent coinciding with that of the sealing strip 156. The sealing strip 156 and the sealing body 166 are further connected by a pin 170 closely fitting in holes therein. A spring 174 is located in the recess 164 acting on the sealing body 166 and biasing the sealing body 166 and the sealing strip 156 to project from the recess 164 and the recess 154, respectively. A hole 174 passing transversely through the sealing body 166 cooperates with a pin 176 of smaller axial extent fixed in the rotor 40 for restriction of the amount of projection.

The engine shown acts in the following way. At start the rotors 40, 46 are brought into rotation by external means, not shown. Fresh air is supplied from the blower 68 through the inlet channels 32, 34 to grooves 48, 52 in the rotors for scavenging and charging thereof. The charged grooves 48, 52 are then brought out of communication with the inlet channels 32, 34 and form separate closed inlet sluice chambers, each defined by the flanks 136, 138 and 70, 72 of a groove 48 and 52, respectively, and by a facing portion of the barrel wall of the bore 24, 26 enclosing the rotor 40, 46. After the formation of the sluice chamber, fuel is injected into the groove 52 of the secondary rotor 46 by the injection nozzle 62. As the rotors 40, 46 continue to, the two inlet sluice chambers, one associated with each rotor 40, 46, are brought together to form a single operation chamber, which first continuously diminishes in volume to a minimum value when the trailing land 50 of the groove 48 in the primary rotor 40 having formed one inlet sluice chamber is in maximum intermesh with the groove 52 in the secondary rotor 46 having formed the other inlet sluice chamber, thus compressing the air-fuel mixture originally trapped in the inlet sluice chambers. The compressed air-fuel mixture is ignited by the spark plug 64 when the operation chamber has reached its minimum volume. From the minimum volume the operation chamber continuously increases in volume to a maximum value after which the operation chamber is divided into two separate outlet sluice chambers, defined similarly to the inlet sluice chambers. During the period of increasing volume of the operation chamber, the burnt gases expand and produce power. The outlet sluice chambers finally open towards the outlet channels 36, 38 thus releasing the pressure of the expanded combusted burnt, exhaust gas after which the grooves 48, 52 are scavenged and charged once more and the cycle is repeated. The function of the inlet and outlet sluice chambers to cut off any communication between the operation chamber and the inlet channels 32, 34 and the outlet channels 36, 38, respectively, and to transfer fresh gas without any compression thereof from the inlet channels to an operation chamber by using the trailing lands 50, 54 of the grooves 48, 52 forming the sluice chambers as inlet gates and the leading lands 50, 54 of the grooves as outlet gates, brings in two new phases in the internal combustion cycle and furthermore result in an elimination of "the dead volume" existing in all practically used engines and thus in the use of the complete displacement volume as effective inlet volume.

During this action cycle the sealing strips 146 (FIGS. 9, 15) in the crest portions 140 of the lands 50 of the primary rotor 40 are brought into continuous contact with the confronting barrel wall of the bore 24 from the intersection line 30 to the intersection line 28. They are brought into contact by the springs 148, by the centrifugal forces and by the gas pressure in the slots 144, thus preventing leakage peripherally along said barrel wall from sluice and operation chambers to the inlet and outlet channels and from the operation chambers to the sluice chambers. Each sealing strip 146 is further, by means of the gas pressure, brought into sealing contact with the low pressure side of the enclosing slots 144 so that leakage peripherally through the slots 144 around the strips 146 is prevented. Owing to the T-shaped profiles of the slots 144 and the strips 146, the projection of the strips 146 when passing from the intersection line 28 to the intersection line 30 is positively restricted. The sealing bodies 156 in the end surfaces of the primary rotor 40 and located adjacent to the bottom portions 142 of the grooves 48 are brought into continuous sealing contact with the confronting end walls of the working space 22 during the complete cycle by the springs 162 so that leakage radially from the grooves 48 along said end walls is prevented. The sealing strips 152 in the end surfaces of the lands 50 of the primary rotor 40 are, by the springs 162 and 172 and by the gas pressure in the slots 150, brought into continuous sealing contact with the confronting end walls of the working space 22 except when passing the ports therein communicating with the inlet and outlet channels 32, 36 so that leakage peripherally from the sluice and operation chambers along said end walls is prevented. Leakage along the slots 150 inside the sealing strips 152 is restricted by the sealing bodies 156, 166 which positively block the leakage spaces between the bottoms of the grooves 150 and the inner surfaces of the sealing strips 152 owing to the fact that they sealingly project into the appropriate recesses 154, 164 below the bottoms of the slots 150. The radially inner ends of the sealing strips 152 are continuously in contact with the end walls of the working space 22 and the projection of the radially outer ends thereof is restricted by the pins 170, 176 connecting the sealing strips 152 with the cylindrical sealing bodies 166 and the cylindrical sealing bodies 166 with the rotor 40, respectively.

The sealing strips 88, 90 (FIG. 4) in the axially extending edges of the flanks 70, 72 of the grooves 52 of the secondary rotor 46 have a double function. By the springs 92, 94, by the centrifugal forces and by the gas pressure in the slots 84, 86 the strips 88, 90 are brought into continuous contact with the confronting barrel wall of the bore 26 from the intersection line 30 to the intersection line 28 thus preventing leakage peripherally along said barrel wall form the sluice and operation chambers to the inlet and outlet channels and from the operation chambers to the sluice chambers. Each sealing strip 90 in the trailing flanks 72 of the grooves 52 further sealingly cooperates with the confronting flank 138 of the cooperating land 50 of the primary rotor 40 from the intersection line 28 to the position of the land 54 of the secondary rotor 46 carrying the strip 90 in which that land 54 is in maximum intermesh with the corresponding groove 50 of the primary rotor 40 thus preventing leakage along the flank 72 from one operation chamber to a consecutive one. Each sealing strip 88 in the leading flanks 70 of the grooves 52 correspondingly further sealingly cooperate with the confronting leading flank 136 of the cooperating land 50 of the primary rotor 40 from the position of the land 54 of the secondary rotor 46 carrying the strip 88 in which that land 54 is in maximum intermesh with the corresponding groove 50 of the primary rotor 40 to the intersection line 30 thus preventing leakage along the flank 70 from one operation chamber to a consecutive one. Owing to the openings 96 in the strips 88, 90 and the pins 98 in the rotor 46 the projection of the strips 88, 90 when out of contact with anyone of the other members 20, 40 of the engine is positively restricted. The sealing strips 110 in the end surfaces of the secondary rotor 46 are by the springs 116, 134 and by the gas pressure in the slots 108 brought into continuous sealing contact with the confronting end walls of the working space 22 except when passing the ports therein communicating with the inlet and outlet channels 34, 38 so that leakage from the sluice and operation chambers along said end walls is prevented. The radially innermost portion of the sealing strips 110 are continuously in contact with the end wall of the working space 22 and the projection of the radially outermost portions of the strips 110 is restricted by the tongues 112 extending into the notches 106 in the axially extending sealing strips 88, 90. The cylindrical sealing bodies 122 in the end surfaces of the lands 54 of the secondary rotor 46 are in continuous sealing contact with the confronting end walls of the working space 22 except when passing the ports therein communicating with the inlet and outlet channels 34, 38 so that leakage radially in the space between the sealing strips 110 along said end walls is prevented. The projections 124 of the sealing bodies 112 extending into the extension 120 of the cylindrical recesses 118 further prevent any leakage between the different slots 84, 86 enclosing the sealing strips 88 and 90, respectively. The projection of the cylindrical sealing bodies 122 is restricted by the contact between the cylindrical sealing bodies 122 and the sealing strips 110 provided with the tongue 112 extending into the notches 106 of the axially extending sealing strips 88, 90.

It has to be observed that each operation chamber all the time on one side thereof is bounded by two complete flanks 70, 72 of a groove 52 of the secondary rotor 46 whereas on the other side thereof the operation chamber in different positions of the rotors 40, 46 is bounded by different portions of the flanks 136, 138 of the primary rotor 40. The portions of the primary rotor flanks 136, 138 bounding different operation chambers are separated by the contact with an axially extending sealing strip 88, 90 carried by the female rotor 46. With regard to the sealing function it is consequentially of utmost importance that the sealing strips 152 (FIG. 9) in the end surfaces of the primary rotor land 50 all the time are located in close proximity to the corresponding flank 136, 138 of the land 50 whereas the sealing strips 110 (FIG. 4) in the end surfaces of the secondary rotor 46 without too much damage may be some distance from the adjacent flank 70, 72 of the groove 52 as long as the radially outermost end of the strip 110 is connected to the corresponding axially extending sealing strip 88, 90.

Each of the lines forming the perimeters of a sluice or operation chamber is thus continuously sealed during the complete period of existence of the chamber. The axially extending perimeters of the operation chambers are further in different positions of the rotors 40, 46 sealed by different sealing strips 88, 90, 146 so disposed in the rotors that a consecutively acting strip takes over the sealing function from a strip being brought out of contact with some overlap therebetween thus guaranteeing a continual sealing function.

I claim:

1. A set of sealing means for a rotary internal combustion engine of the type comprising
  a stationary housing member providing a working space, generally in the form of two intersecting bores with parallel axes, having ciricumferential and end walls, and carrying charging and discharging means for the engine,
  and two generally cylindrical members, one forming a primary power rotor and the other a secondary counter rotor,
  said rotors being mounted in said housing member and disposed in respective bores of said working space, each cylindrical member having grooves extending axially thereof spaced by lands provided with axially extending crest portions, said lands and grooves of the cylindrical members intermeshing to form operation chambers of the engine,
  each land of said power rotor having two generally convex flanks, each following a curve of substantially epitrochoidal shape generated by the axially extending crest edge portion of a cooperating groove flank of the secondary counter rotor as the cylindrical members rotate, the number of grooves of the secondary counter rotor being greater than that of the primary power rotor,
  each groove in the counter rotor having two generally concave flanks and being, remote from the axially extending crest edge portions of the flanks, at least partially relieved with respect to the envelope developed by a rotor land when passing into and out of mesh with said groove as the cylindrical members rotate;
  the end faces and the crest portions of the cylindrical members having slots formed therein;
  said set of sealing means comprising
    a first group including sealing elements carried at least by said secondary counter rotor in the axially extending slots therein, and means for biasing each of said axially extending sealing elements towards a confronting surface of another member to provide periodic sealing contact therewith; and
    a second group including sealing elements carried in slots in the faces of the cylindrical members forming the exterior ends of said lands, and means for biasing each of said elements located in the end faces towards a confronting surface of another member to provide sealing contact therewith, said elements of the second group extending out to the crest of each land and forming a continuous sealing line around each such face;
    wherein the sealing elements of the first group comprise a strip in said crest edge portion of each groove flank of the counter rotor, said strip sliding along a cooperating land flank of the power rotor from one radial extreme thereof to the other,
    and wherein sealing elements of the second group comprise a strip in a slot disposed in close proximity to the flank of each land of the power rotor and curved correspondingly to the profile of said flank.

2. A set of sealing means as defined in claim 1, in which said second group of sealing means comprises recesses formed in the power rotor and being deeper than, and crossing said slots for the strips, and sealing bodies sealingly mounted in said recesses and projecting thereinto beneath the bottoms of said slots, said sealing bodies being provided with notches in their face into which adjacent strips extend to form a seal therebetween.

3. A set of sealing means as defined in claim 2, in which a sealing body is disposed adjacent to each crest edge portion of the secondary counter rotor and sealingly cooperates on one side with a sealing strip of said first group and on the other side with a sealing strip of the second group extending around the adjacent abutment groove to the sealing body adjacent to the other crest edge portion of the groove.

4. A set of sealing means as defined in claim 1, in which said sealing strips of the first group carried by the secondary counter rotor extends radially outwardly of the secondary rotor for periodic sliding contact with the confronting circumferential wall of the housing member.

5. A set of sealing means as defined in claim 1, in which said sealing elements of the first group comprise a strip in the crest portion of each land of the cylindrical members for periodic sliding contact with the confronting circumferential wall of the housing member.

References Cited

UNITED STATES PATENTS

| | | | |
|---|---|---|---|
| 1,023,360 | 4/1912 | Braver | 418—123 |
| 1,024,787 | 4/1912 | King | 418—117 |
| 1,118,840 | 11/1914 | Bjornson | 418—121 |
| 1,240,112 | 9/1917 | Winger | 418—113 |
| 2,380,752 | 7/1945 | Grieb | 418—123 |
| 3,083,699 | 4/1963 | Froede | 418—119 |
| 3,117,562 | 1/1964 | Hajet | 123—8.47 |
| 3,194,489 | 7/1965 | Frenzel | 418—117 |
| 3,196,849 | 7/1965 | Paschke | 418—119 |
| 3,435,808 | 4/1969 | Allender | 123—8.47 |
| 2,393,116 | 1/1946 | McCulloch et al. | 418—142 |

CARLTON R. CROYLE, Primary Examiner

J. J. VRABLIK, Assistant Examiner

U.S. Cl. X.R.

418—121, 122, 142, 191

UNITED STATES PATENT OFFICE
CERTIFICATE OF CORRECTION

Patent No. 3,664,778            Dated May 23, 1972

Inventor(s) Hans Robert Nilsson

It is certified that error appears in the above-identified patent and that said Letters Patent are hereby corrected as shown below:

Column 1, line 32, delete "on" and in its place insert -- or --. Column 5, line 39, after "to" insert -- rotate --. Column 7, line 66, correct the spelling of "circumferential". Column 8, line 8, correct the spelling of "flank".

Signed and sealed this 28th day of November 1972.

(SEAL)
Attest:

EDWARD M. FLETCHER, JR.          ROBERT GOTTSCHALK
Attesting Officer                Commissioner of Patents